(12) United States Patent
Sueoka

(10) Patent No.: US 10,216,001 B2
(45) Date of Patent: Feb. 26, 2019

(54) CAMERA SHAKE CORRECTION APPARATUS

(71) Applicant: OLYMPUS CORPORATION, Hachioji-shi, Tokyo (JP)

(72) Inventor: Yoshiaki Sueoka, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 20 days.

(21) Appl. No.: 15/372,355

(22) Filed: Dec. 7, 2016

(65) Prior Publication Data

US 2017/0176765 A1    Jun. 22, 2017

(30) Foreign Application Priority Data

Dec. 22, 2015  (JP) .................. 2015-250192

(51) Int. Cl.
*G02B 27/64*  (2006.01)
*G02B 7/02*   (2006.01)

(52) U.S. Cl.
CPC ............. *G02B 27/646* (2013.01); *G02B 7/02* (2013.01)

(58) Field of Classification Search
CPC . G02B 7/00; G02B 7/02; G02B 7/023; G02B 7/04; G02B 7/09; G02B 27/64; G02B 27/644; G02B 27/646; G03B 5/00; G03B 5/02
See application file for complete search history.

(56) References Cited

U.S. PATENT DOCUMENTS

| 2005/0180275 A1* | 8/2005 | Shiraki | G02B 7/08 369/44.15 |
| 2008/0187301 A1* | 8/2008 | Takahashi | G03B 5/00 396/55 |
| 2012/0154614 A1* | 6/2012 | Moriya | G03B 3/10 348/208.5 |
| 2013/0107380 A1* | 5/2013 | Miura | G03B 5/02 359/814 |
| 2017/0108660 A1* | 4/2017 | Kuo | G02B 27/646 |

FOREIGN PATENT DOCUMENTS

JP    2015055794 A    3/2015

\* cited by examiner

*Primary Examiner* — Thong Nguyen
(74) *Attorney, Agent, or Firm* — Holtz, Holtz & Volek PC

(57) ABSTRACT

A camera shake correction apparatus (100) comprising a coil (8) provided at the movable member (2), a magnet (41) used for driving provided at the stationary member (4), facing the coil (8) in the direction orthogonal to the optical axis (C), a yoke (43) provided at the stationary member (4), facing the coil (8) and the magnet (41) used for driving in the direction of the optical axis, the yoke and the magnet used for driving constituting a magnetic circuit (6), and a magnet (11) used for biasing provided at the movable member (2), facing the yoke (43) in a non-contact manner on the opposite side of the coil (8) and the magnet (41) used for driving, the magnet (41) used for biasing applying a magnetic suction force to the yoke (43).

6 Claims, 9 Drawing Sheets

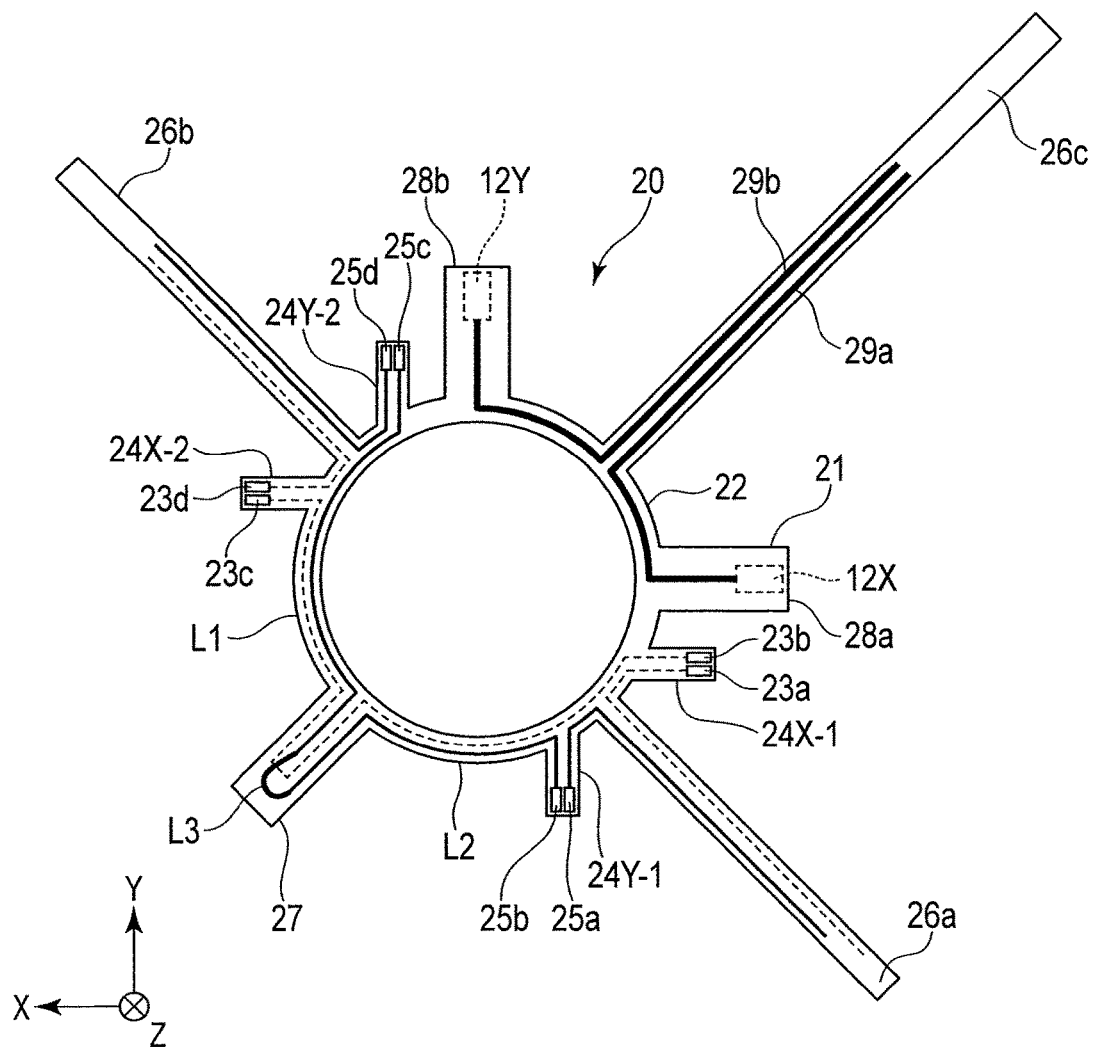
F I G. 3

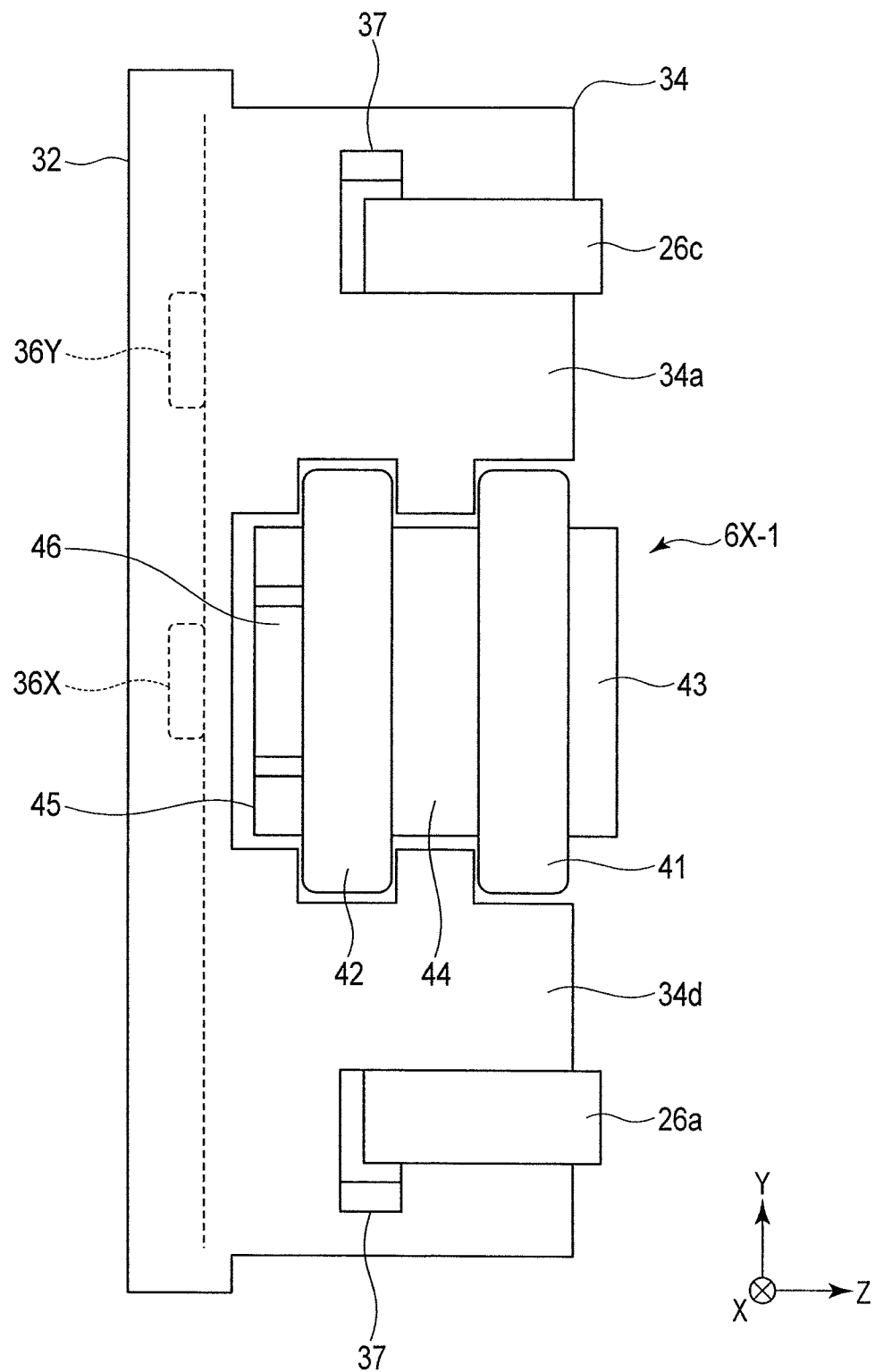
F I G. 8

CAMERA SHAKE CORRECTION APPARATUS

CROSS-REFERENCE TO RELATED APPLICATIONS

This application is based upon and claims the benefit of priority from Japanese Patent Application No. 2015-250192, filed Dec. 22, 2015, the entire contents of which are incorporated herein by reference.

FIELD

The present invention relates to a camera shake correction apparatus which corrects a camera shake by moving a movable member which holds an optical member, such as a lens, in a direction orthogonal to an optical axis, for example.

BACKGROUND

A camera shake correction apparatus moves an optical member, such as a lens, in a direction orthogonal to an optical axis so as to correct a camera shake, for example. A camera shake correction apparatus comprises a movable member which holds an optical member, a stationary member which movably supports the movable member in a direction orthogonal to an optical axis, a plurality of rollers arranged between the movable member and the stationary member, and an actuator which moves the movable member with respect to the stationary member along a plane orthogonal to the optical axis.

For example, as an actuator of this type, a voice coil motor (VCM) having a coil provided at a movable member and a magnet provided at a stationary member being opposite to the coil is known. In order to hold the movable member with respect to the stationary member, biasing spring, which biases the movable member with respect to the stationary member in the direction of the optical axis and presses down the plurality of rollers between the movable member and the stationary member, is provided.

As this type of a biasing spring, a magnetic spring, in which a magnetic body is provided at the movable member facing a magnet of the stationary member, is known. The magnetic spring does not generate a stress in the direction orthogonal to the optical axis, it applies magnetic absorption force in a direction along the optical axis; thus, the magnetic spring does not affect the driving performance at the time of camera shake correction.

However, when the magnetic body provided at the movable member faces the magnet of the stationary member as described above, it is necessary to arrange the magnetic body at a position where the magnet is overlaid along the optical axis. In this case, if the size of the surface in respect to the direction orthogonal to the optical axis of the magnetic is small, an area where the magnetic body can be arranged is limited, and the degree of design flexibility is low.

SUMMARY

The purpose of the present invention is to provide a camera shake correction apparatus which can increase the flexibility in a magnetic spring layout.

To achieve the above purpose, the camera shake correction apparatus according to the embodiment of the present invention moves a movable member which holds a lens in a direction orthogonal to the optical axis with respect to a stationary member facing the movable member in the direction of the optical axis of the lens with a plurality of rollers being interposed therebetween. This camera shake correction apparatus has a coil provided at a movable member and having a hollow portion in a direction orthogonal to an optical axis; a first yoke provided at a stationary member, being inserted through the hollow portion of the coil; a first magnet used for driving provided at the stationary member, facing the coil in a direction orthogonal to the optical axis and facing the stationary member in a direction of the optical axis on the opposite side of the first yoke; a second yoke provided at the stationary member, facing the coil and the first magnet in a direction of the optical axis on the opposite side of the first yoke; a second magnet used for driving provided at the stationary member, facing the coil in a direction orthogonal to an optical axis and facing the first yoke in a direction of an optical axis on the opposite side of the first magnet; a third yoke provided at the stationary member, facing the coil and the second magnet in a direction of the optical axis on the opposite side of the first yoke; a magnet used for biasing provided at the movable member facing the second yoke in a non-contact manner on the opposite side of the coil and the first magnet, the magnet used for biasing applying magnetic suction force to the second yoke, wherein the magnet used for biasing is solidly fixed to the movable member facing the coil in such a manner that a magnet pole opposite to the magnet pole of the magnet used for driving facing the yoke faces the opposite side of the yoke.

According to the camera shake correction apparatus of the present invention, the flexibility in the layout of a magnetic spring can be increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 3 is a development view of a flexible printed circuit (FPC) adhered on the back of the movable member shown in FIG. 2.

FIG. 8 is a side view of the camera shake correction apparatus viewed from the direction indicated by the arrow VIII shown in FIG. 7.

DETAILED DESCRIPTION

Figure 1:
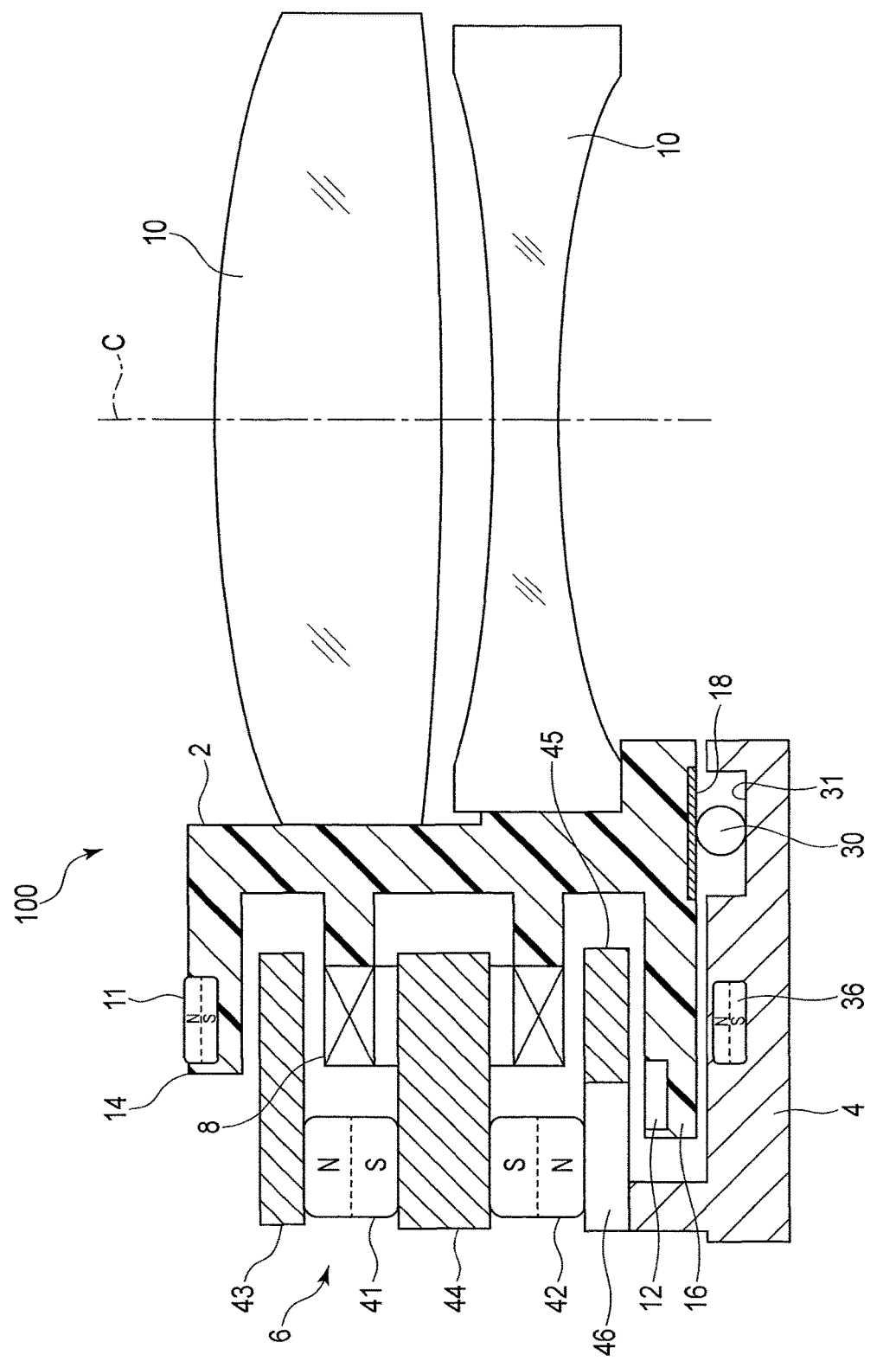
FIG. 1 is a partial expanded sectional view of the main part of the camera shake correction apparatus according to an embodiment.

An embodiment of the present invention will now be described with reference to the accompanying drawings.

In the following description, an axis corresponding to the optical axis C of the lens 10 (an optical member) is referred to as the Z axis, and the two axes orthogonal to one another on the plane orthogonal to the Z axis are referred to as the X axis and the Y axis. The X, Y, and Z axes are shown in the drawings as needed.

The camera shake correction apparatus 100 of the present embodiment is an apparatus for correcting a camera shake when shooting by driving at least one lens 10 in a direction orthogonal to the optical axis C (the Z axis) (i.e., the direction along the XY plane), the lens being included in an optical system which forms an image of a subject on an imaging element of a camera.

FIG. 1 is a partial expanded sectional view of the main part of the camera shake correction apparatus 100. The camera shake correction apparatus 100 comprises a movable member 2 which solidly fixes two pieces of the lenses 10 with respect to the same axis, a stationary member 4 which movably holds the movable member 2 along the XY plane orthogonal to the optical axis C, and a magnetic circuit 6 which moves the movable member 2 along the XY plane with respect to the stationary member 4.

Figure 7:
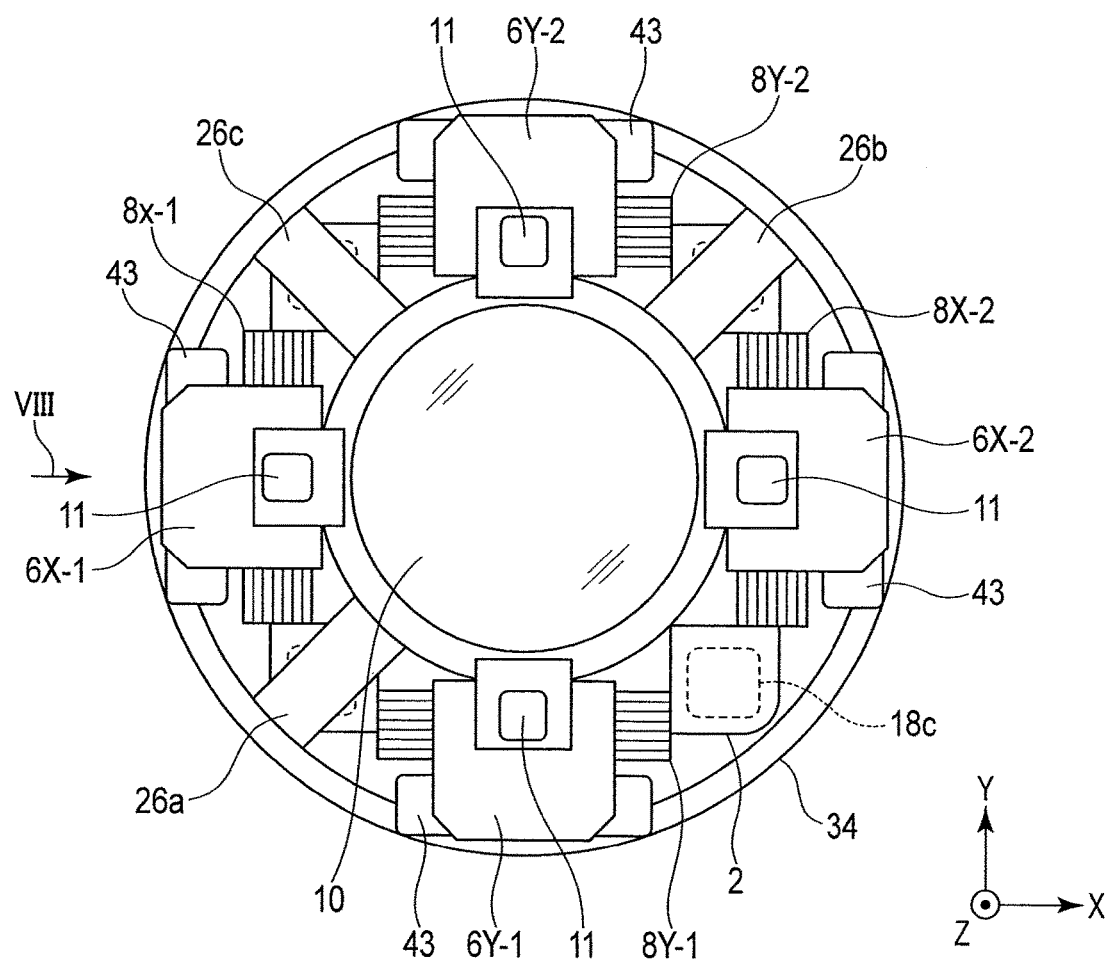
FIG. 7 is a front view of the main part of the camera shake correction apparatus to which four magnetic circuits are installed by embedding the stationary member shown in FIG. 4 to the stationary member shown in FIG. 6, viewed from the subject side.

The magnetic circuit 6 includes a pair of magnetic circuits 6X-1 and 6X-2 which move the movable member 2 in the X-axis direction with respect to the stationary member 4, and a pair of magnetic circuits 6Y-1 and 6Y-2 which move the movable member 2 in the Y-axis direction with respect to the stationary member 4 (see FIG. 7). The magnetic circuits 6X-1 and 6X-2 are opposite to each other along the X axis with the lenses 10 interposed therebetween, and the magnetic circuits 6Y-1 and 6Y-2 are opposite to each other along the Y axis with the lenses 10 interposed therebetween at a phase difference of 90 degrees from the pair of the magnetic circuits 6X-1 and 6X-2. These four magnetic circuits 6X-1, 6X-2, 6Y-1, and 6Y-2 have approximately the same structure; accordingly, each of the four magnetic circuits may be called the magnetic circuit 6 in the following description.

Figures 2A, 2C:
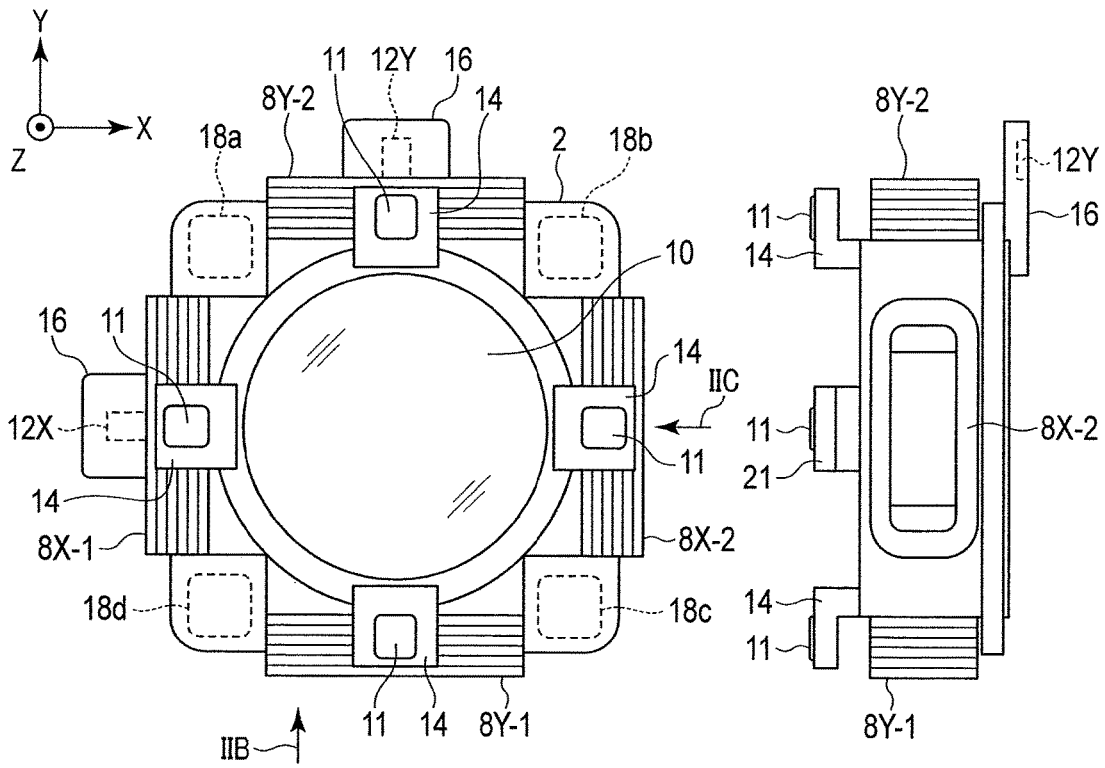
FIG. 2A is a front view of the movable member of the camera shake correction apparatus shown in FIG. 1, viewed from the subject side.
FIG. 2C is a side view of the movable member shown in FIG. 2A, viewed in the direction indicated by the arrow IIC.
Figure 2B:
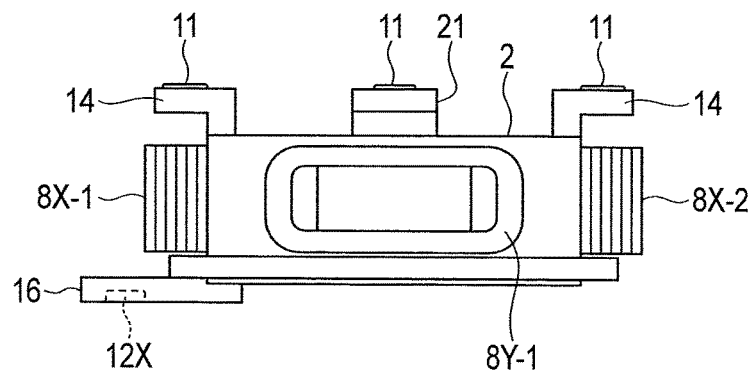
FIG. 2B is a side view of the movable member shown in FIG. 2A, viewed in the direction indicated by the arrow IIB.

FIG. 2A is a plan view of the movable member 2 holding the lenses 10 along the Z axis, viewed from the subject side (hereinafter, the front side); FIG. 2B is a side view of the movable member 2 viewed in the direction indicated by the arrow IIB shown in FIG. 2A; and FIG. 2C is another side view of the movable member 2 viewed in the direction indicated by the arrow IIC shown in FIG. 2A.

The movable member 2 comprises, in addition to the lenses 10, four coils 8X-1, 8X-2, 8Y-1 and 8Y-2 which are respectively allocated to the four magnetic circuits 6X-1, 6X-2, 6Y-1, and 6Y-2, four magnets 11 used for biasing, being respectively opposite to the four magnetic circuits, and two Hall elements 12X and 12Y (position detection sensors). In the following description, each of the four coils 8X-1, 8X-2, 8Y-1, and 8Y-2 may be called the coil 8. The two Hall elements 12X, 12Y may be collectively referred to as the Hall element 12.

Each coil 8 is solidly fixed to the movable member 2 in such a manner that the hollow portion is orthogonal to the optical axis C and the short side is along the optical axis C. In other words, the coil 8X-1 is provided facing the magnetic circuit 6X-1 in a position in which the hollow portion is along the X axis, the coil 8X-2 is provided facing the magnetic circuit 6X-2 in a position in which the hollow portion is along the X axis, the coil 8Y-1 is provided being opposite to the magnetic circuit 6Y-1 in a position in which the hollow portion is along the Y axis, and the coil 8Y-2 is provided being opposite to the magnetic circuit 6X-2 in a position in which the hollow portion is along the Y axis. The four coils 8X-1, 8X-2, 8Y-1, and 8Y-2 are arranged around the lenses 10 at a pitch of 90 degrees.

The magnet 11 used for biasing is solidly fixed to the movable member 2, being separated in the Z-axis direction from the edge on the front side of the coil 8. In other words, the movable member 2 integrally has four holding pieces 14 for holding the magnets 11 separately from the coils 8 in the Z-axis direction. The four magnets 11 are arranged symmetrically with respect to the optical axis C, so that biasing force in the Z-axis direction that acts on the stationary member 4 can be equally given to the movable member 2. In other words, the four magnets 11 function as a magnetic spring that generates force attracting the movable member 2 to the stationary member 4 when the magnets are magnetically suctioned to the yoke 43 (a yoke, a second yoke) (see FIG. 1) on the front side of the respectively-corresponding four magnetic circuits 6X-1, 6X-2, 6Y-1, and 6Y-2. Accordingly, it is desirable to arrange each magnet 11 at a position where the magnet is aligned with the yoke 43 in the Z-axis direction.

The magnet 11 used for biasing is attached to the holding piece 14 facing the magnet 41 (a first magnet) used for driving in such a manner that the opposite poles face each other. In other words, the attachment direction of the magnet 11 used for biasing is determined in accordance with the direction of a flux leaking from the magnetic circuit 6. If the magnet 11 used for biasing is attached facing the magnet 41 used for driving with the yoke 43 interposed therebetween in such a manner that the same magnetic poles face each other, a flux acts in a direction in which cancels the flux of the magnet 11 used for biasing, resulting in weakened magnetic suction force. For this reason, in the present embodiment, the magnet 11 used for biasing is attached facing the magnet 41 used for driving in such a manner that the opposite magnetic poles face each other.

The magnet 11 used for biasing is arranged at a position closer to the optical axis C than the magnet 41 used for driving is; the magnet 11 is arranged at a position substantially in alignment with the coil 8 in the Z-axis direction and in misalignment with the magnet 41 for driving along the XY plane. Thus, the length of the holding piece 14 can be shortened by arranging the magnet 11 used for biasing at a position close to the optical axis C, thereby preventing resonance generation. The magnet 11 used for biasing may be arranged at a position facing the yoke 43 which is a target for suction, and therefore, the magnet 11 has relatively high layout flexibility along the XY plane.

The Hall element 12X is attached to a position where the element faces the magnetic circuit 6X-1 used for moving the movable member 2 in the X-axis direction. The other Hall element 12Y is attached to a position where the element faces the other magnetic circuit 6Y-2 used for moving the movable member 2 in the Y-axis direction. Each of the Hall elements 12X and 12Y is attached in a certain direction in such a manner that the strength of a flux in the Z-axis direction can be detected. The Hall element 12X detects a position of the movable member 2 along the X axis with respect to the stationary member 4, and the Hall element 12Y detects a position of the movable member 2 along the Y-axis with respect to the stationary member 4. Each of the Hall elements 12X and 12Y is attached to the movable member 2 via the holding piece 16.

Figure 4:
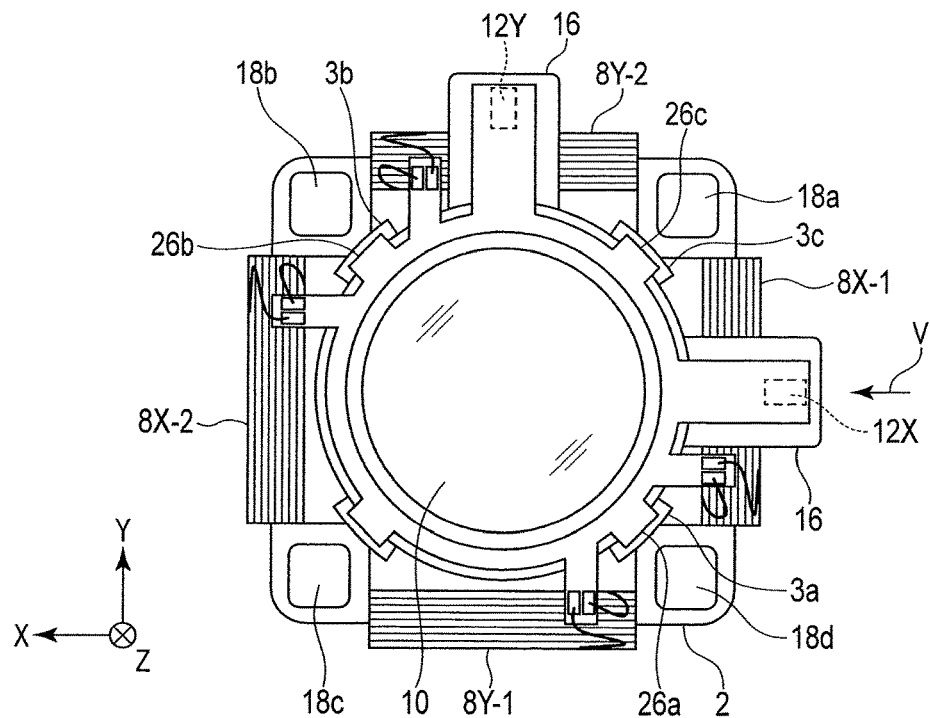
FIG. 4 is a rear view indicating a status where the FPC shown in FIG. 3 is adhered on the back of the movable member.
Figure 5:
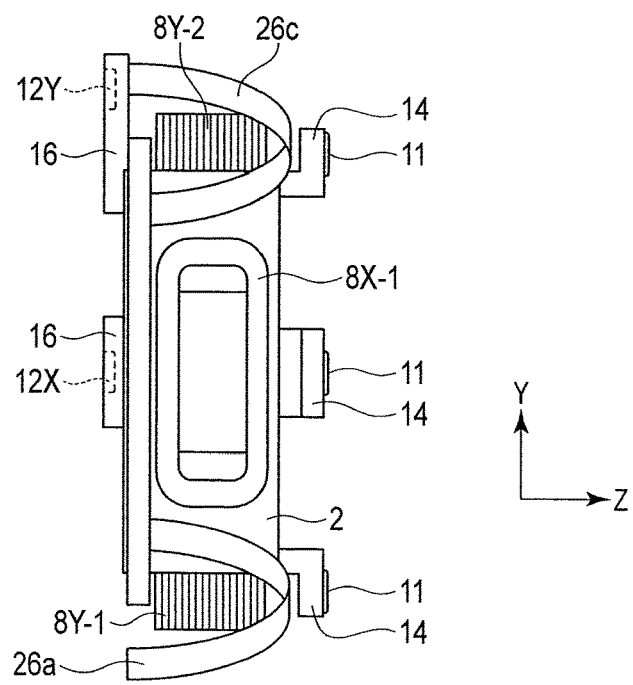
FIG. 5 is a side view of the movable member shown in FIG. 4, viewed in the direction indicated by the arrow V.

FIG. 3 is a development view of a flexible printed circuit 20 (hereinafter, the FPC 20) adhered on the image sensor side of the movable member 2 (hereinafter, the back side). FIG. 4 is a rear view indicating a status where the FPC 20 is adhered on the movable member 2, and FIG. 5 is a side view of the movable member 2 viewed in the direction indicated by the arrow V shown in FIG. 4.

The FPC 20 has a circular portion 22 (an annular portion) arranged outside of the effective diameter of the lens 10. The FPC 20 has first wiring L1, in which two coils 8X-1 and 8X-2 of an actuator that moves the movable member 2 along the X axis are connected in series, and second wiring L2, in which two coils 8Y-1 and 8Y-2 of an actuator that moves the movable member 2 along the Y axis are connected in series. The FPC 20 further comprises a jumper line L3 to have the first wiring L1 cross over the second wiring L2.

The FPC 20 integrally has a plurality of branch portions 24X-1, 24X-2, 24Y-1, 24Y-2, 26a, 26b, 26c, 27, 28a, and 28b radially projecting toward the outside of the annular portion 22. In other words, the FPC 20 has a substrate 21 which is a sheet of shape-processed resin film. Conversely, the substrate 21 includes the annular portion 22 and the plurality of branch portions 24X-1, 24X-2, 24Y-1, 24Y-2, 26a, 26b, 26c, 27, 28a, and 28b. The first wiring L1, the second wiring L2, and the jumper line L3 are provided on the back of the substrate 21 (on the front side in FIG. 3).

Since the wiring in the stationary member 4 and the movable member 2 is separately formed in each of the narrow branch portions 26a, 26b, and 26c of the substrate 21 of the FPC 20, it is possible to minimize counterforce from the FPC 20 which is generated when the movable member 2 moves with respect to the stationary member 4.

The branch portion 24X-1 extends toward the coil 8X-1 from the annular portion 22 along the X axis, and has two terminal pads 23a and 23b at its distal end to connect the ends of the coil 8X-1. The branch portion 24X-2 extends toward the coil 8X-2 from the annular portion 22 along the X axis, and has two terminal pads 23c and 23d at its distal end to connect the ends of the coil 8X-2. The terminal pads 23a, 23b, 23c, and 23d are provided on the back of the substrate 21.

The branch portion 24Y-1 extends toward the coil 8Y-1 from the annular portion 22 along the X axis, and has two terminal pads 23a and 23b at its distal end to connect the ends of the coil 8Y-1. The branch portion 24Y-2 extends toward the coil 8Y-2 from the annular portion 22 along the X axis, and has two terminal pads 25c and 25d at its distal end to connect the ends of the coil 8Y-2. The terminal pads 25a, 25b, 25c, and 25d are provided on the back of the substrate 21.

The branch portion 26a extends between the branch portion 24X-1 connecting the coil 8X-1 and the branch portion 24Y-1 connecting the coil 8Y-1, and guides one end of the first wiring L1 and one end of the second wiring L2, side by side. The branch portion 26b on the opposite side of the branch portion 26a with the lens 10 being interposed therebetween extends between the branch portion 24X-2 connecting the coil 8X-2 and the branch portion 24Y-2 connecting the coil 8Y-2, and guides the other end of the first wiring L1 and the other end of the second wiring L2, side by side. The branch portion 27 extended between the branch portions 24X-2 and 24-1 has the jumper line L3.

The branch portions 26a and 26b are bent over together with the branch portion 26c (described later) toward the front side of the movable member 2, and are inserted through a cable hole 37 (described later) of the stationary member 4; thus, those portions are longer than the other branch portions. The relatively long branch portions 26a, 26b, and 26c are extended from the annular portion 22 at respective portions so as not to interfere with the magnetic circuits 6X-1, 6X-1, 6Y-1, and 6Y-2. In other words, the branch portion 26a extends between the magnetic circuits 6X-1 and 6Y-1, and the branch portions 26b extends between the magnetic circuits 6X-2 and 6Y-2.

The first wiring L1 is connected to the terminal pad 23a of the branch portion 24X-1 from the branch portion 26a via the annular portion 22, and is connected to the terminal pad 23b via the coil 8X-1. The first wiring L1 is connected to the terminal pad 23c from the terminal pad 23b via the branch portion 24X-1, the annular portion 22, the branch portion 27, the annular portion 22, and the branch portion 24X-2, and to the terminal pad 23d via the coil 8X-2. Then, the first wiring L1 is exported from terminal pad 23d to the branch portion 26b via the branch portion 24X-2 and the annular portion 22. Thus, the first wiring L1 connects the coils 8X-1 and 8X-2 in series.

The second wiring L2 is connected to the terminal pad 25a of the branch portion 24Y-1 from the branch portion 26a via the annular portion 22, and to the terminal pad 25b via the coil 8Y-1. The second wiring L2 is connected to the terminal pad 25c from the terminal pad 25b via the branch portion 24Y-1, the annular portion 22, the branch portion 27, the annular portion 22, and the branch portion 24Y-2, and to the terminal pad 25d via the coil 8Y-2. Then, the second wiring L2 is exported from terminal pad 25d to the branch portion 26b via the branch portion 24Y-2 and the annular portion 22. Thus, the second wiring L2 connects the coils 8Y-1 and 8Y-2 in series.

The jumper line L3 constitutes a part of the second wiring L2 which crosses the first wiring L1 in the branch portion 27, and crosses the first wiring L1 while being electrically insulated from the first wiring L1. The branch portion 27 is formed with a comparatively large width in order to implement zero ohm resistance (not shown), and is suitable to be provided with the jumper line L3.

The branch portion 26c radially extends on the opposite side of the branch portion 27 with respect to the lens 10. The branch portion 28a extends between the branch portion 26c and the branch portion 24X-1 along the X axis. Furthermore, the branch portion 28b extends between the branch portion 26c and the branch portion 24Y-1 along the Y axis. These branch portions 26c, 28a, and 28b are provided separated from the other branch portions 24X-1, 24X-2, 24Y-1, 24Y-2, 26a, 26b, and 27 with respect to the circumferential direction of the annular portion 22.

The Hall element 12X for detecting a position of the movable member 2 along the X axis is implemented at the distal end of the branch portion 28a extending along the X axis. The Hall element 12X is fixed to the holding piece 16 which is implemented on the front of the FPC 20 and arranged on the back of the movable member 2. The Hall element 12Y for detecting a position of the movable member 2 along the Y axis is implemented at the distal end of the branch portion 28b extending along the Y axis. The Hall element 12Y is fixed to the holding piece 16 which is implemented on the front of the FPC 20 and arranged on the back of the movable member 2.

The Hall element 12X has a signal cable 29a including four lines of wiring which is not shown herein. The signal cable 29a is exported to the branch portion 26c from the Hall element 12X through the branch portion 28a via the annular portion 22. The Hall element 12Y has a signal cable 29b including four lines of wiring not shown herein. The signal cable 29b is exported to the branch portion 26c from the Hall element 12Y through the branch portion 28b via the annular portion 22. Thus, these signal cables 29a and 29b are provided at a position where they do not interfere with the first wiring L1 and the second wiring L2. As a result, the influence of the noise on the Hall elements 12X and 12Y can be reduced, and the accuracy in the position detection can be increased.

Furthermore, it is possible to reduce the size of an apparatus configuration by connecting in series the coils 8X-1 and 8X-2 for driving the movable member 2 along the X axis and by connecting in series the coils 8Y-1 and 8Y-2 for driving the movable member 2 along the Y axis, as described above.

For example, if at least one coil for driving the movable member 2 along the X axis and one coil for driving the movable member 2 along the Y axis are provided, it is possible to move the movable member 2 along the XY plane; however, it is necessary to arrange one coil on one side of the lens 10 in the X-axis direction and the other coil on one side of the lens 10 in the Y-axis direction, and this makes the balance worse for the apparatus configuration in the XY plane having the optical axis C as its center. If space is provided on the side where the coils are not arranged in order to improve the balance of the apparatus configuration, the entire size of the apparatus will become undesirably large. For this reason, the layout of the present embodiment in which the four coils 8 are arranged around the lenses 10 is effective in reducing the size of the apparatus configuration.

Moreover, a serial connection of two pairs of coils facing each other with the lenses 10 being interposed therebetween makes it possible to achieve stable balance in driving the movable member 2. Suppose if each of the two pairs of coils facing each other are connected in parallel, a slight difference in resistance of the coils would result in a different current flowing in each of the coils, and there would be a difference in driving force. In contrast, if a pair of coils facing each other is connected in series like in the present embodiment, it is possible to make a value of a current flowing in each coil the same, and to reduce the difference in driving force.

Four ball receiving pads 18a, 18b, 18c, and 18d orthogonal to the optical axis C are adhered on the back where the movable member 2 faces the stationary member 4. As shown in FIG. 4, the ball receiving pad 18a is arranged between the coil 8X-1 and the coil 8Y-2; the ball receiving pad 18b is arranged between the coil 8X-2 and the coil 8Y-2; the ball receiving pad 18c is arranged between the coil 8X-2 and the coil 8Y-1; and the ball receiving pad 18d is arranged between the coil 8X-1 and the coil 8Y-1. In the description below, each of the four ball receiving pads 18a, 18b, 18c, and 18d may be referred to simply as ball receiving pad 18.

Figure 6A:
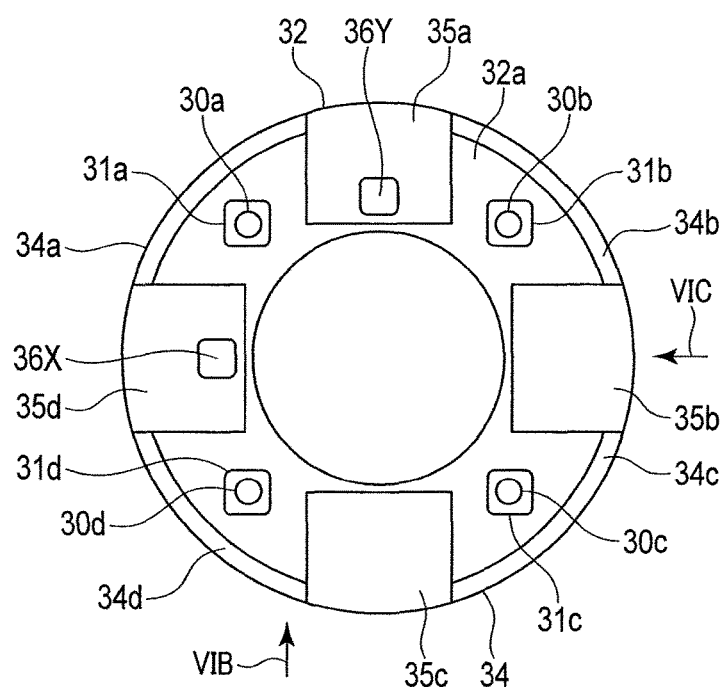
FIG. 6A is a front view of the stationary member of the camera shake correction apparatus shown in FIG. 1, viewed from the subject side.
Figure 6C:
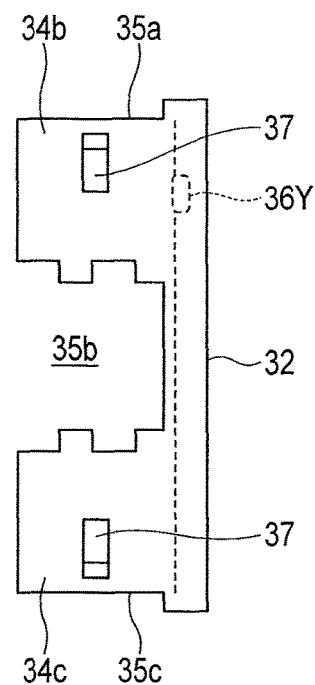
FIG. 6C is a side view of the stationary member shown in FIG. 6A, viewed in the direction indicated by the arrow VIC.
Figure 6B:
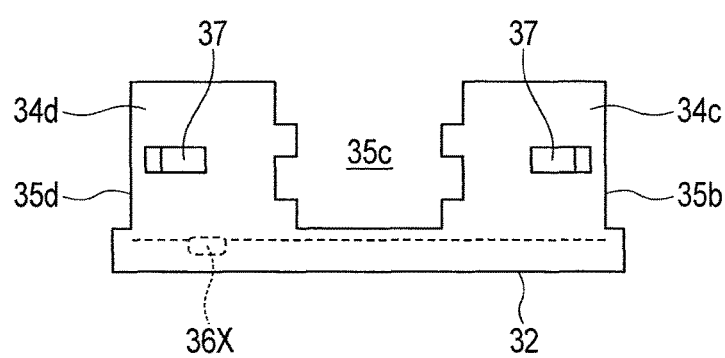
FIG. 6B is a side view of the stationary member shown in FIG. 6A, viewed in the direction indicated by the arrow VIB.

FIG. 6A is a plan view of the stationary member 4 viewed from the front along the Z axis; FIG. 6B is a side view of the stationary member 4 viewed in the direction indicated by the arrow VIB shown in FIG. 6A; and FIG. 6C is another side view of the stationary member 4 viewed in the direction indicated by the arrow VIC shown in FIG. 6A. FIG. 6A shows four balls 30a, 30b, 30c, and 30d (rollers) in addition to the stationary member 4.

The stationary member 4 has a bottom wall 32 having a circular shape, arranged facing the outside of the effective diameter of the lens 10, and a periphery wall 34 having approximately a cylindrical shape, extending on the front side along the Z axis from the outer periphery of the bottom wall 32. The movable member 2 is embedded inside of the periphery wall 34, with the balls 30a, 30b, 30c, and 30d being interposed. Under these conditions, the above-described four magnets 11 used for biasing function as a magnetic spring together with the yoke 43 to press the balls 30a, 30b, 30c, and 30d with the movable member 2 and the stationary member 4, and to hold the balls 30a, 30b, 30c, and 30d between the movable member 2 and the stationary member 4. Thus, it is possible to move the movable member 2 along the XY plane with respect to the stationary member 4, without being separated from the stationary member 4.

More specifically, concave portions 31a, 31b, 31c, and 31d which respectively store the balls 30a, 30b, 30c, and 30d, are provided on the inner surface 32a on the movable member 2 side (the front side) of the bottom wall 32 of the stationary member 4. Each of the concave portions 31a, 31b, 31c, and 31d is provided at a position in which the concave portion faces each of the ball receiving pads 18a, 18b, 18c, and 18d of the movable member 2. In other words, the balls 30a, 30b, 30c, and 30d are respectively arranged in the concave portions 31a, 31b, 31c, and 31d of the stationary member 4, and they are respectively held between the bottom of the concave portion 31 and the ball receiving pad 18 (see FIG. 1).

Auxiliary magnets 36X and 36Y for position detection are provided being exposed to the inner surface 32 where the bottom wall 32 faces the movable member 2. The auxiliary magnets 36X and 36Y are respectively provided in correspondence to the Hall elements 12X and 12Y of the movable member 2. The auxiliary magnets 36X and 36Y are provided to compensate a flux passing the corresponding Hall elements 12X and 12Y. The auxiliary magnets 36X and 36Y are smaller than the magnet 42 used for driving (described later) of the corresponding magnetic circuits 6X-1 and 6Y-1. Providing the auxiliary magnets 36X and 36Y expands the flux range within the movable range of the movable member 2; thus, the controllability can be improved.

The periphery wall 34 has openings 35a, 35b, 35c, and 35d to which the coils 8 of the movable member 2 are exposed. The openings 35a, 35b, 35c, and 35d are provided in the circumferential direction at a pitch of 90 degrees. The openings 35a, 35b, 35c, and 35d receive magnetic circuits 6X-1, 6X-2, 6Y-1 and 6Y-2 (described later), respectively. In other words, the stationary member 4 has four curved periphery walls 34a, 34b, 34c, and 34d between the four openings 35a, 35b, 35c, and 35d. The shape of each of the openings 35a, 35b, 35c, and 35d is a shape that can determine the position for the magnetic circuit 6.

A cable hole 37 is provided on each of the periphery walls 34a, 34b, 34c, and 34d to insert the branch portions 26a, 26b, and 26c of the FPC 20. The branch portion 26a is exported to the front of the movable member 2 through the cable hole 3a of the movable member 2, and is then extracted to the outside of the stationary member 4 through the cable hole 37 on the periphery wall 34d of the stationary member 4. The branch portion 26b is exported to the front of the movable member 2 through the cable hole 3b of the movable member 2, and is then extracted to the outside of the stationary member 4 through the cable hole 37 on the periphery wall 34b of the stationary member 4. The branch portion 26c is exported to the front of the movable member 2 through the cable hole 3c of the movable member 2, and is then extracted to the outside of the stationary member 4 through the cable hole 37 on the periphery wall 34a of the stationary member 4.

Figure 9:
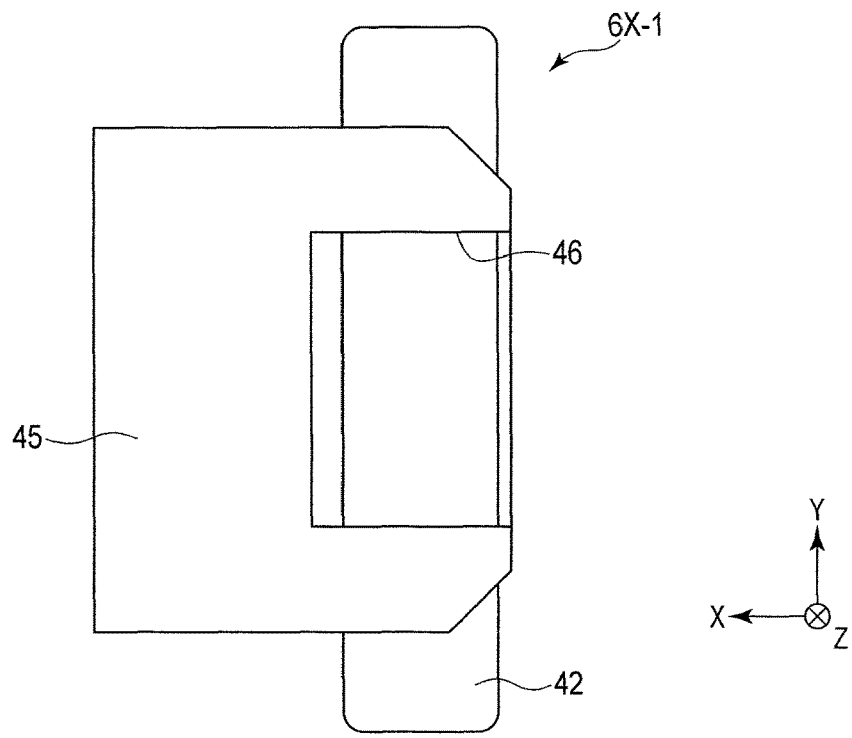
FIG. 9 is a rear view of the magnetic circuit shown in FIG. 7, viewed from the side of an image sensor.

FIG. 7 is a front view of the main part of the camera shake correction apparatus 100, viewed from the subject side. The assembly shown in FIG. 7 is achieved by embedding the movable member 2 in a state where the FPC 20 shown in FIG. 4 is adhered to the inside of the periphery wall 34 of the stationary member 4 shown in FIG. 6 with the balls 30a, 30b, 30c, and 30d being interposed therebetween, inserting the branch portions 26a, 26b, and 26c respectively into the cable holes 3 and 37, and mounting the magnetic circuits 6Y-2, 6X-2, 6Y-1, and 6X-1 respectively to the openings 35a, 35b, 35c, and 35d of the periphery wall 34. FIG. 8 is a side view of the main part of the camera shake correction apparatus 100, viewed from the direction indicated by the arrow VII shown in FIG. 7. FIG. 9 is a rear view of the magnetic circuit 6X-1, viewed from the back side.

The magnetic circuit 6 comprises two magnets 41 and 42 used for driving and three yokes 43, 44, and 45, as shown in FIGS. 1 and 7 to 9. The magnetic circuits 6X-1, 6X-2, 6Y-1 and 6Y-2 have approximately the same structure; accordingly, each of the four magnetic circuits may be called the magnetic circuit 6 in the following description. The magnetic circuit 6 is installed via the opening 35 provided on the periphery wall 34 of the stationary member 4 and is combined with each of the coils 8 of the movable member 2, and the magnetic circuit 6 is then adhesively fixed to the stationary member 4 in a non-contact manner with respect to the constituent elements of the movable member 2.

Under this condition, the yoke 43 (a second yoke) on the foremost front side on the Z axis is arranged facing and being separated from the front of the coil 8. The yoke 45 (a third yoke) on the furthest back on the Z axis is arranged facing and being separated from the back of the coil 8. The yoke 44 (a first yoke) arranged between the yoke 43 and the yoke 45 along the Z axis is inserted in the hollow portion of the coil 8 in a non-contact manner.

The magnet 41 (a first magnet) on the front side with respect to the Z axis is arranged between the yoke 43 and the yoke 44, and both sides, which are separated from each other with respect to the Z axis, are in contact with the yoke 43 and 44 respectively, and they are magnetically suctioned. The magnet 42 (a second magnet) on the back side with respect to the Z axis is arranged between the yoke 44 and the yoke 45, and both sides, which are separated from each other with respect to the Z axis, are in contact with the yoke 44 and 45 respectively, and they are magnetically suctioned. Two magnets 41 and 42 are respectively arranged on the outer side in a diameter direction of the coil 8 along the XY plane, separated from and facing each other. The two magnets 41 and 42 are attached in such a manner that the same poles face each other.

The yoke 45 on the furthest back side has a cutout portion 46 (an opening) at a part facing the magnet 42, as shown in FIG. 9. The cutout portion 46 is, as shown in FIG. 8, has a width greater than the width of the auxiliary magnet 36, and is interposed between the magnet 42 used for driving and the Hall element 12, as shown in FIG. 1. Thus, the cutout portion 46 facilitates the passing of a flux from the magnet 42 through the Hall element 12, thereby improving the accuracy of position detection for the movable member 2 with respect to the stationary member 4.

As shown in FIG. 1, providing the auxiliary magnet 36 used for detection on the opposite side of the magnet 42 used for driving with the Hall element 12 being interposed can increase a differential among fluxes passing through the Hall element 12 within the movable range of the movable member 2, thereby improving the accuracy of position detection. Furthermore, the auxiliary magnet 36 is attached in such a manner that a magnetic pole (the north pole in the present embodiment) that is the same as a magnetic pole (the north pole in the present embodiment) of the magnet 42 used for driving facing the Hall element 12 faces the Hall element 12. For this reason, the linearity of the signal detected through the Hall element 12 can be improved when the movable member 2 moves along the XY plane with respect to the stationary member 4.

Figure 10:
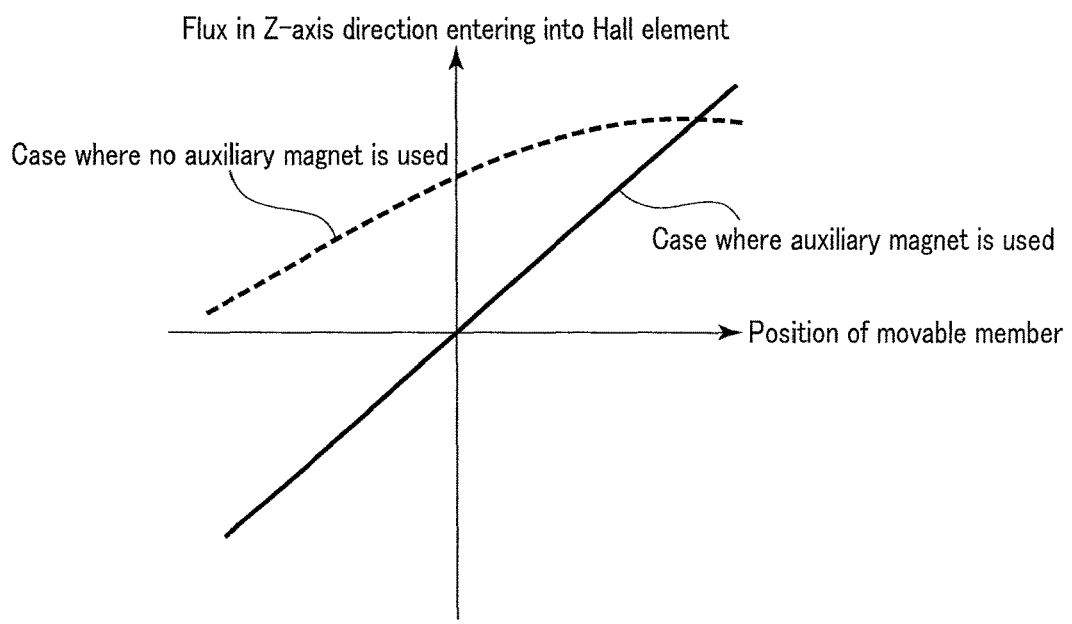
FIG. 10 is a graph indicating the output of a Hall element when an auxiliary magnet shown in FIG. 1 is provided.

FIG. 10 shows a solid-line graph of the detection signal of the Hall element 12 in the camera shake correction apparatus 100 of the present embodiment in which the auxiliary magnet 36 is provided. A broken-line graph of the detection signal when no auxiliary magnet 36 is provided is shown side by side for the purpose of comparison. If there is no auxiliary magnet 36, the direction of the flux passing the Hall element 12 is only one direction, and thus the graph is biased on the plus side (or the minus side), and the linearity becomes worse. On the other hand, in the apparatus of the present embodiment in which the auxiliary magnet 36 is provided, the flux in an opposite direction from the auxiliary magnet 36 passes the Hall element 12, and the linearity of the detection signal is improved.

The Hall element 12 is desirably arranged at a position where its center line in line with the optical element C is located closer to the optical axis C than that of the center line of the magnet 42 used for driving along the optical axis C. The Hall element 12 is further desirably arranged in such a manner that its center line is arranged on a side separated further from the optical axis C than that of the center line of the auxiliary magnet 36 in line with the optical axis C. In other words, the auxiliary magnet 36 is desirably arranged in such a manner that its center line is arranged closer to the optical axis C than that of the center line of the Hall element 12.

Figure 11:
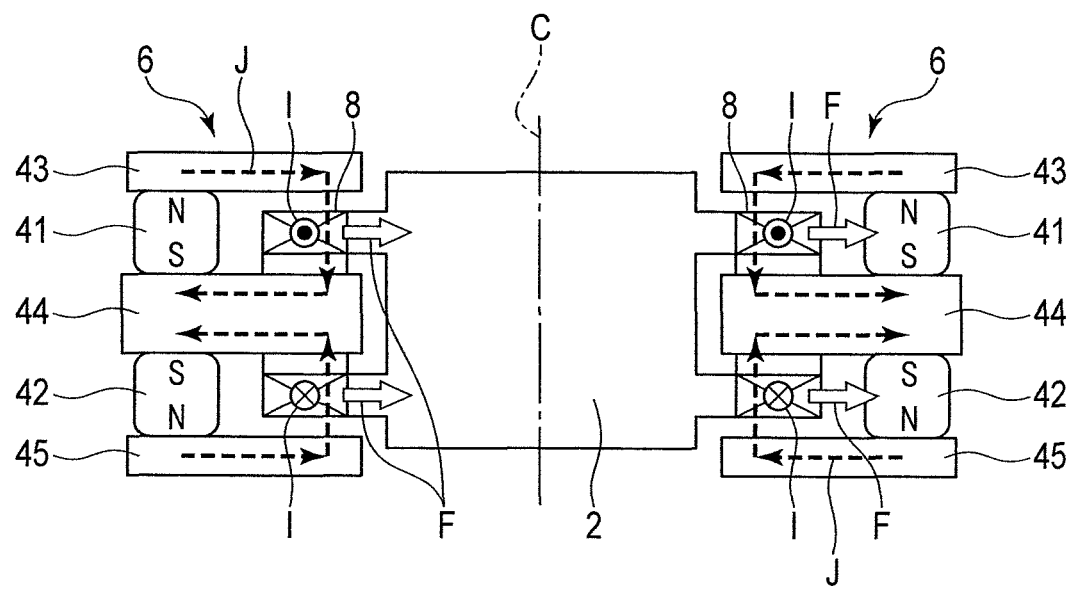
FIG. 11 is an explanatory drawing of the principle of driving the camera shake correction apparatus shown in FIG. 1.

FIG. 11 is an explanatory drawing of the principle of driving the above-described camera shake correction apparatus 100. As shown in FIG. 11, when a current I flows in the coil 8, magnetic force F acts on the movable member 2 based on Fleming's left-hand rule by a flux J generated by the magnetic circuit 6. It is possible to reverse the direction of the magnetic force F acting on the movable member 2 by reversing the direction of the current I flowing in the coil 8. Thus, the movable member 2 can move along the XY plane with respect to the stationary member 4, using the pair of the magnetic circuits 6X-1 and 6X-2 arranged along the X axis and the pair of the magnetic circuits 6Y-1 and 6Y-2 arranged along the Y axis.

Thus, according to the present embodiment, since a magnet 11 used for biasing is provided solidly fixed to the movable member 2 and faces the yoke 43 that is solidly fixed to the stationary member 4, the yoke 43 and the magnet 11 function as a magnet spring to hold the movable member 2 with respect to the stationary member 4. At this time, the magnet 11 used for biasing can be arranged in the Z-axis direction to face the yoke 43 of a relatively large size along the XY plane, thereby improving the flexibility of the layout of the magnet 11 along the XY plane.

According to the present embodiment, the magnet 11 used for biasing is arranged facing the yoke 43, in such a manner that a magnetic pole of the magnet 11 is opposite to the magnetic pole of the magnet 41 used for driving facing the yoke 43. Thus, it is possible to set the direction of a flux coming from a magnetic spring to correspond to the direction of a flux leaking from the VCM, and to improve the magnetic suction force acting between the movable member 2 and the stationary member 4.

The present invention has been described based on the embodiment, but the present invention is in no way limited to those embodiments. The present invention can of course be modified in various manners, without departing from the spirit and scope of the invention.

The inventions according to the other embodiments are described below as supplementary.

[1]

The camera shake correction apparatus which moves a movable member holding a lens in a direction orthogonal to an optical axis of the lens with respect to a stationary member, the apparatus comprising:

a coil provided at the stationary member and having a hollow portion in the direction orthogonal to the optical axis;

a first yoke 44 provided at the stationary member and arranged being inserted through the hollow portion of the coil;

a first magnet 41 used for driving and a second magnet 41 used for driving provided at the stationary member at a position where the magnets face the coil having the hollow portion in the direction orthogonal to the optical axis, and where the magnets face each other in the direction of the optical axis with the first yoke 44 being interposed therebetween;

a second yoke 43 provided at the stationary member, being arranged opposite to the first yoke in the direction of the optical axis with respect to the first magnet;

a third yoke 46 provided at the stationary member, being arranged opposite to the first yoke in the direction of the optical axis with respect to the second magnet;

a magnet 11 used for biasing provided at the movable member, arranged opposite to the coil with respect to the second yoke 43, the magnet 11 applying magnetic suction force to the second yoke, wherein the magnetic poles of the first magnet and the second magnet are arranged in such a manner that the magnetic pole of the first magnet on the first yoke side is the same as the magnetic pole of the second magnet on the first yoke side, the first magnet and the magnet used for biasing are arranged in such a manner that the magnetic pole of the magnet used for biasing on the second yoke side is different from the magnetic pole of the magnet used for driving on the second yoke side.

[2]

The camera shake correction apparatus described in [1], wherein the magnet used for biasing is arranged side by side with the coil in the direction of the optical axis with the second yoke being interposed therebetween.

[3]

The camera shake correction apparatus described in [1], wherein the magnet used for biasing is solidly fixed to the movable member in such a manner that the magnet falls under the range of the second yoke when the movable member is driven.

[4]

The camera shake correction apparatus described in [2], wherein the magnet used for biasing is provided at a position where the magnet used for biasing does not face the magnet used for driving in the direction of the optical axis with the yoke being interposed therebetween.

[5]

A camera shake correction apparatus which moves a movable member holding a lens in a direction orthogonal to an optical axis with respect to a stationary member facing the movable member in the direction of the optical axis of the lens, with a plurality of rollers being interposed therebetween, the camera shake correction apparatus comprising:

a coil provided at the stationary member and having a hollow portion in the direction orthogonal to the optical axis;

a first yoke provided at the stationary member, being inserted through the hollow portion of the coil;

a first magnet used for driving provided at the stationary member, facing the coil in a direction orthogonal to an optical axis and facing the first yoke in a direction of the optical axis;

a second yoke provided at the stationary member, facing the coil and the first magnet in the direction of the optical axis on the opposite side of the first yoke; and a magnet used for biasing provided at the movable member, facing the second yoke in a non-contact manner on the opposite side of the coil and the first magnet, the magnet used for applying a biasing magnetic suction force

The invention claimed is:

1. A camera shake correction apparatus which is configured to move a movable member holding a lens in a direction orthogonal to an optical axis of the lens with respect to a stationary member which faces the movable member in a direction of the optical axis of the lens with a plurality of rollers being interposed between the movable member and the stationary member, the apparatus comprising:

a coil provided at the movable member;

a magnet used for driving provided at the stationary member and facing the coil in the direction orthogonal to the optical axis;

a yoke provided at the stationary member and facing the coil and the magnet used for driving in the direction of the optical axis; and a magnet used for biasing provided at the movable member and facing the yoke in a non-contact manner on an opposite side of the yoke with respect to the coil and the magnet used for driving, the magnet used for biasing applying a magnetic suction force to the yoke.

2. The camera shake correction apparatus according to claim 1, wherein:

said yoke is a second yoke;

said magnet used for driving is a first magnet used for driving;

the coil has a hollow portion in the direction orthogonal to the optical axis;

the camera shake correction apparatus further comprises a first yoke provided at the stationary member and inserted through the hollow portion of the coil;

the second yoke faces the coil and the first magnet in the direction of the optical axis on an opposite side of the coil and the first magnet with respect to the first yoke;

the camera shake correction apparatus further comprises a second magnet used for driving provided at the stationary member, facing the coil in the direction orthogonal to the optical axis, and facing the first yoke in the direction of the optical axis on an opposite side of the first yoke with respect to the first magnet used for driving;

the camera shake correction apparatus further comprises a third yoke provided at the stationary member and facing the coil and the second magnet in the direction of the optical axis on an opposite side of the coil and the second magnet with respect to the first yoke; and the magnet used for biasing is solidly fixed to the movable member facing the coil in such a manner that a magnet pole of the magnet used for biasing that faces the second yoke is opposite to a magnet pole of the first magnet used for driving that faces the second yoke.

3. The camera shake correction apparatus according to claim 1, wherein the magnet used for biasing is solidly fixed to the movable member in such a manner that a magnet pole of the magnet used for biasing that faces the yoke is opposite to a magnet pole of the magnet used for driving that faces the yoke.

4. The camera shake correction apparatus according to claim 1, wherein the magnet used for biasing is provided at a position where the magnet used for biasing does not face the magnet used for driving with the yoke being interposed therebetween.

5. The camera shake correction apparatus according to claim 1, wherein:
said yoke is a second yoke;
the coil has a hollow portion in the direction orthogonal to the optical axis;

the camera shake correction apparatus further comprises a first yoke provided at the stationary member and inserted through the hollow portion of the coil;

the magnet used for driving faces the first yoke in the direction of the optical axis; and the second yoke faces the coil and the first magnet used for driving in the direction of the optical axis on an opposite side of the coil and the magnet used for driving with respect to the first yoke.

6. A camera shake correction apparatus which is configured to move a movable member holding a lens in a direction orthogonal to an optical axis of the lens with respect to a stationary member which faces the movable member in a direction of the optical axis of the lens with a plurality of rollers being interposed between the movable member and the stationary member, the apparatus comprising:

a coil provided at the movable member and having a hollow portion in the direction orthogonal to the optical axis;

a first yoke provided at the stationary member and inserted through the hollow portion of the coil;

a magnet used for driving provided at the stationary member and facing the coil in the direction orthogonal to the optical axis;

a second yoke provided at the stationary member and facing the coil and the magnet used for driving in the direction of the optical axis on an opposite side of the coil and the magnet used for driving with respect to the first yoke; and a magnet used for biasing provided at the movable member and facing the second yoke in a non-contact manner on an opposite side of the second yoke with respect to the coil and the magnet used for driving, the magnet used for biasing applying a magnetic suction force to the second yoke.

* * * * *